United States Patent [19]

Wingfield, Jr. et al.

[11] Patent Number: 4,515,659

[45] Date of Patent: May 7, 1985

[54] PYROLYTIC CONVERSION OF PLASTIC AND RUBBER WASTE TO HYDROCARBONS WITH BASIC SALT CATALYSTS

[75] Inventors: Robert C. Wingfield, Jr.; Jacob Braslaw, both of Southfield; Roy L. Gealer, West Bloomfield, all of Mich.

[73] Assignee: Ford Motor Company, Dearborn, Mich.

[21] Appl. No.: 429,586

[22] Filed: Sep. 30, 1982

[51] Int. Cl.$^3$ .................... C10B 53/00; C10B 57/04; C10B 57/12

[52] U.S. Cl. .................................. 201/2.5; 585/241

[58] Field of Search .................. 201/2.5, 25; 585/241

[56] References Cited

U.S. PATENT DOCUMENTS

| | | | |
|---|---|---|---|
| 1,846,363 | 2/1932 | Schisler | 585/241 |
| 3,765,851 | 10/1973 | White | 201/2.5 |
| 3,901,951 | 8/1975 | Nishizaki | 585/241 |
| 4,151,216 | 4/1979 | Smith | 585/214 |
| 4,251,500 | 2/1981 | Morita et al. | 585/241 |
| 4,303,477 | 12/1981 | Schmidt et al. | 201/25 |

FOREIGN PATENT DOCUMENTS

| | | |
|---|---|---|
| 0022214 | 1/1981 | European Pat. Off. ............. 201/2.5 |
| 2925620 | 1/1981 | Fed. Rep. of Germany . |
| 2944989 | 5/1981 | Fed. Rep. of Germany . |
| 0729177 | 4/1980 | U.S.S.R. ............................ 585/241 |

OTHER PUBLICATIONS

Appell et al.; "Conversion of Urban Refuse to Oil"; Bureau of Mines; pp. 1-5; May 1970.
Processing of Plastic Waste and Scrap Tires into Chemical Raw Materials, Especially by pyrolysis, Sinn, H., Kaminsky, W., Janning, J., Angnew Chem. Int. Ed. Engl/vol. 15, (1976), No. 11, 660–672.
Pyrolytic Recovery of Raw Materials from Special Wastes, Collin, G., 1980 ACS., pp. 479–484.
Pyrolytisch Rohstoff-Ruckgewinnung aus unterscheidlichen Sonder abfallen in einem Drehtrommelreaktor, Collin, G., Grigoleit, G., Michel, E., Chem.-Ing. Tech 51, (1979), Nr. 3, S. 220–224.

*Primary Examiner*—Bradley Garris
*Attorney, Agent, or Firm*—Lorraine S. Melotik; Roger L. May

[57] ABSTRACT

The invention relates to a process for improving the pyrolytic conversion of waste selected from rubber and plastic to low molecular weight olefinic materials by employing basis salt catalysts in the waste mixture. The salts comprise alkali or alkaline earth compounds, particularly sodium carbonate, in an amount of greater than about 1 weight percent based on the waste feed.

11 Claims, 1 Drawing Figure

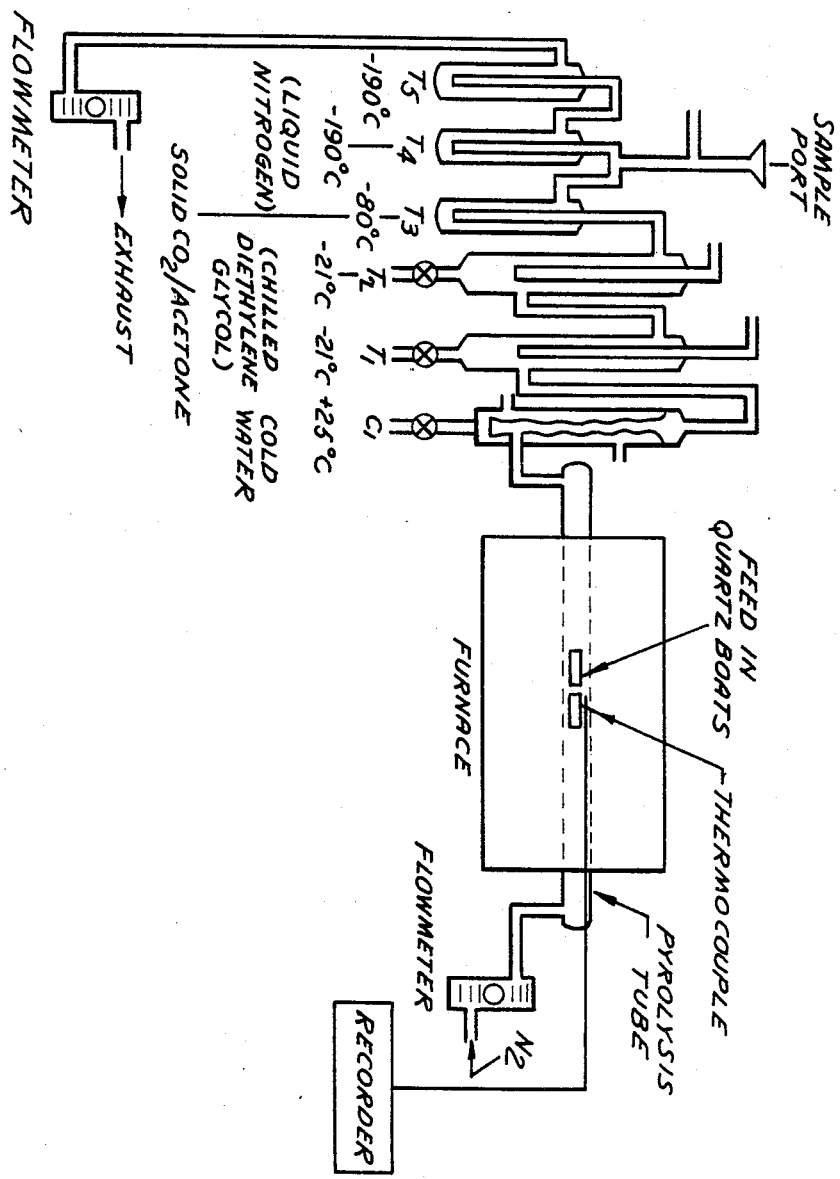

PYROLYTIC CONVERSION OF PLASTIC AND RUBBER WASTE TO HYDROCARBONS WITH BASIC SALT CATALYSTS

This invention was made under contract with or subcontract thereunder of the Department of Energy Contract #DE-AC02-78-ER10049.

TECHNICAL FIELD

This invention relates to a process for improving the pyrolytic conversion of plastic and rubber wastes to volatile materials. More particularly, it relates to the use of basic salt catalysts to substantially increase the yields of low molecular weight olefin products and, with particular embodiment catalysts, to enhance the pyrolytic conversion of carbon in the waste to volatile products.

BACKGROUND ART

When scrapped automobiles are shredded to recover ferrous and non-ferrous metals, large quantities of non-metallic solid waste are generated consisting mainly of rubber and plastic materials. The disposal of this material presently requires the use of valuable land-fill sites and constitutes the waste of potentially valuable resources. Pyrolysis, i.e., thermal decomposition in the absence of oxygen, of these mainly organic wastes into char and gaseous and liquid chemicals is one approach to an ecologically responsible as well as a profitable means of recycling both energy and chemical materials.

Pyrolyzed shredder waste has been shown to yield substantial amounts of highly aromatic pyrolysis oil from which chemical materials such as benzene, toluene and xylene can be produced. Often, however, processes developed for the pyrolysis of plastic and rubber wastes have as their objective the generation of oil products which can be used as fuel oils, i.e., for their energy content. The gaseous products produced by such processes are generally simply combusted prior to release into the atmosphere. Advantageously, these gases have been burnt to generate heat for the pyrolytic or other processes. Undesirable conversion products such as e.g., ammonia, sulfur or acidic materials which may be present in the oil or gas can be removed by adding reactive chemicals to the waste or by scrubbing the volatilized products.

DISCLOSURE OF THE INVENTION

This invention provides a process for the improved pyrolytic conversion of waste selected from plastic and rubber to olefinic hydrocarbons by means of basic salt catalysts. The process is characterized by comprising: introducing into a pyrolysis zone particles of the waste and at least about 1 weight percent, preferably between about 3 and about 15 weight percent, basic salt catalyst based on the weight of the waste, preferably alkali or alkaline earth metal carbonates, most preferably sodium carbonate; heating the waste salt mixture in the pyrolysis zone to a temperature of between about 400° and 700° C., preferably between about 450° and about 650° C., while flowing inert gas therethrough; maintaining the temperature of the pyrolysis zone and the flowing gas for a time sufficient to pyrolyze the waste to char and volatile hydrocarbon-containing products; cooling the volatile products so as to separate the volatile products into a gas fraction and oil fractions; and recovering the fractions.

The catalyst may be admixed with the waste either prior to and/or during pyrolysis of the wastes.

Advantageously, we have now found that the basic salt catalyst effects an increase in the amount of waste material converted to low molecular weight $C_1$-$C_4$ olefinic materials, particularly isobutylene. Therefore, by means of this process the opportunity to utilize these pyrolysis decomposition products as low molecular weight chemical feedstock is greatly enhanced. The pyrolysis of wastes, according to this invention, employing such alkali metal catalysts has been found to increase the yield of isobutylene by at least approximately 650 percent when compared to uncatalyzed pyrolysis of such wastes. Use of particular embodiment basic salt catalysts has also been found to increase the amount of waste material converted to volatile products.

DESCRIPTION OF THE DRAWING

The FIGURE illustrates a typical laboratory system which may be used to pyrolyze rubber and plastic waste according to the process of the invention and subsequently recover the hydrocarbon gaseous and oil products.

BEST MODE FOR CARRYING OUT THE INVENTION

The automobiles being manufactured today contain a number of plastic and rubber components of varied composition. Typically, rubber and polyurethanes constitute the largest fraction, followed by glass reinforced polyester and polypropylene, as can be seen from Table I. Therefore, the shredding of the automobile will yield a very complex polymeric mixture. The shredded waste, in addition to the rubber and plastic materials, also contains a low level of metal resulting from the incomplete removal of metal and metal embedded in the rubber and plastic.

TABLE I

| PLASTICS AND RUBBER IN 1979-1981 AUTOMOBILES* ||
|---|---|
| Component | Percent of Total |
| Non-Tire Rubber | 34.0 |
| Polyurethane | 14.8 |
| Reinforced Polyester | 14.2 |
| Polypropylene | 12.7 |
| Polyvinyl Chloride | 9.9 |
| ABS | 5.1 |
| Nylon | 2.4 |
| Acrylics | 1.6 |
| Phenolics | 1.6 |
| Other | 3.7 |

*Sources:
MODERN PLASTICS; January ANNUAL REVIEWS (January 1979-81)
ELASTOMERICS; January ANNUAL REVIEWS (January 1979-81)

In the process of this invention, the feed material is reduced to a particle size suitable for introduction into the pyrolysis zone. Consideration should be given to selecting that particle size which would give optimal surface contact with the added salts during pyrolysis, so as to have maximum efficiency of the catalyst of this process. The waste and the basic salt are then introduced into the pyrolysis zone, which may be preheated, and heated in the pyrolysis zone to a temperature of between about 400° C. and 650° C., more preferably between about 450° C. and 650° C., most preferably between about 550° C. and 650° C. with a continuous inert gas sweep. Any inert, i.e., non-oxidizing, gas may be employed in this process, e.g., helium, carbon dioxide, and mixtures thereof. A mixture of nitrogen and carbon dioxide, for example, can be obtained by burning a fuel gas mixture with a stoichiometric amount of air. The temperature of the pyrolysis zone and the flowing inert gas are maintained for a time sufficient to pyrolyze the waste to char and volatile hydrocarbon containing products. The hydrocarbon vapors generated are cooled to separate the products into a gas fraction and oil fractions, which are subsequently recovered.

The quartz tube batch pyrolysis apparatus shown in the FIGURE exemplifies one system for carrying out the improved process taught herein. In one particular embodiment of this system, the quartz tube has a two inch diameter and surrounding a portion of the quartz tube is a single zone tube furnace which gives a heated zone of about 36 inches. For processing in this system, the waste is ground to a particle size of about 2 mm diameter, mixed with the basic salt catalyst, placed in a quartz boat and subsequently introduced into the pyrolysis zone. In this embodiment, nitrogen is employed as the inert gas with flow rates of 100 cc-400 cc/minute being suitable. The volatile hydrocarbon-containing products generated by the pyrolysis are condensed in a series of traps and recovered.

A continuously fed rotary kiln system can also be employed to carry out the process of the subject invention. The use of a rotary kiln advantageously offers mixing of the waste/salt mixture as well as continuous contact with the heated walls of the kiln. Additionally, a rotary kiln process more easily allows for continuous and rapid processing. A condensation train is attached at the discharge end of the rotary kiln for trapping the liquid condensate and sampling the gaseous product. In this system, the salts can be added to the waste before and/or during the pyrolysis of the waste. The particle size of the waste introduced into the rotary kiln is generally larger than that, for example, of a batch process, however particle size of the waste would vary with kiln design and size.

The basic salt catalyst employed in the process of this invention are preferably selected from oxides, hydroxides and carbonates of alkali or alkaline earth metals. More preferably, the catalyst is selected from carbonates of potassium, sodium, magnesium or calcium, with sodium carbonate being most preferred. Compatible mixtures of these salts may also be employed as the catalyst in this invention. The catalyst is included with the waste during pyrolysis in an amount greater than about 1, preferably between about 3 and about 15, most preferably between about 5 and about 10 weight percent bases on the weight of the waste feed.

The basic salt catalyst may be employed in this invention as (dry) particulate wherein the catalyst particle size is preferably below about 0.25 mm, more preferably below about 0.1 mm diameter. Optionally, in the case of water soluble basic salt catalysts, the catalyst may be employed in an aqueous solution of the salts. When employing an aqueous solution of a soluble basic salt catalyst, e.g., $Na_2CO_3$, the solution can be sprayed on to the waste prior to its introduction into the kiln or furnace. The water will evaporate during initial heating of the waste, leaving a finely divided film of salt crystals on the surface of the waste material to be pyrolyzed. Selection of the optimal concentration of the aqueous solution so as to apply the required amount of salt catalyst would be within the skill of one in the art. As would be apparent to one in the art, a particulate salt catalyst as well as an aqueous solution of salt catalyst, employing the same or different catalyst would also be suitable; for example, an aqueous solution could be employed on the waste prior to pyrolysis and particulate added during pyrolysis.

While the quartz tube and rotary systems described above can be employed in the improved process of the subject invention to pyrolyze rubber and plastic waste, they should not be construed as limiting to the process. Any pyrolytic system, wherein a rubber and plastic waste/salt mixture can be suitably pyrolyzed is acceptable. Selection of optimal process parameters, including those for particle size, pyrolysis temperature within those claimed, process time, inert gas, and gas sweep rate, for example, would be well within the skill of those in the art.

It should be apparent that while the plastic and rubber waste converted by means of this invention were shredded wastes obtained from scrapped automobiles, any plastic and rubber waste would be advantageously converted by means of the process of this invention. By including basic salt catalysts in rubber and plastic waste subjected to pyrolysis, an increase in the conversion of carbon in such wastes to valuable low molecular weight olefinic products is effected. Additionally, with particular embodiments of these catalysts, the process enhances the volatilization of the carbon in the waste, i.e., leaving less char.

INDUSTRIAL APPLICABILITY

It will be obvious from the foregoing that this invention has industrial applicability to processes for the pyrolytic conversion of rubber and plastic wastes to hydrocarbons and provides for increased conversion of such wastes to volatile products including low molecular weight olefinic hydrocarbons.

The invention will be further understood by referring to the following detailed examples. It should be understood that the specific examples are presented by way of illustration and not by way of limitation.

EXAMPLE 1

(a) Forty one grams of a mixture of ground automobile shredder waste are placed on a quartz boat. This boat is then placed inside the pyrolysis zone of a quartz tube pyrolysis chamber (shown in the FIGURE) and heated to 560° C., with a continuous nitrogen sweep. The tube furnace is equipped with a proportional temperature controller with automatic reset that maintains accuracy of ±1° C. with ambient changes of up to 5° C. The temperature is maintained at that level for about one hour, after which the furnace is allowed to cool. The volatile products are condensed to give a total liquid yield of 33.9% by weight of the feed and a gas yield of 20.4% by weight of the feed. The trapped gases are identified by Fourier transform infrared spectroscopy. The total olefin ($C_2$, $C_3$, and $C_4$) concentration of the gas is 20.4 mole percent which includes an isobutylene concentration of 0.8 mole percent. (b) A well dispersed mixture of forty grams of ground shredder waste and two grams of anhydrous (minus 100 mesh) sodium carbonate powder is prepared. After pyrolysis in the same furnace, at the same holding temperature and time as above, a total liquid yield of 36.7% by weight of the waste feed obtained. In addition, 19.1% by weight of the waste feed is converted to gaseous products. These gases contain 26.1 mole percent $C_2$-$C_4$ olefins (about a 20 percent olefin yield increase over that produced in the previous experiment without catalysts).

This olefin mixture includes about 6.6 mole percent isobutylene (an isobutylene increase of about 670 percent over the isobutylene yield produced in the previous experiment without catalysts).

EXAMPLE 2

The catalyzed experiment described above is repeated, except that zinc carbonate powder is used instead of sodium carbonate, and the holding temperature is raised to 662° C. A total liquid yield of 32.8% based on shredder waste feed is obtained. The gaseous yield is 19.6% by weight of the shredder waste. The total olefin ($C_2$ to $C_4$) concentration of the gases is 22.2 mole percent, including 6.4 mole percent isobutylene (an isobutylene increase of about 670% compared to uncatalyzed pyrolysis).

EXAMPLE 3

Mixtures of shredder waste and carbonate salts are prepared as shown in Table 2. Sixty milligram samples of these mixtures are placed in the platinum pan of a Model 951 thermogravimetric analyzer (DuPont). The samples are then heated under flowing nitrogen from 25° C. to 800° C. at 20° C. per minute and then held at 800° C. for 10 minutes.

The weight of the sample in the pan is followed. The char remaining in the platinum pan upon reaching 650° C., when corrected for its chlorine content and excess unreacted additive is given as a percent of the shredder waste feed in Table 2.

TABLE 2

| Shredder Waste Weight Percent | Additive Type | Wt. % | Char Yield (corrected for effect of catalyst addition) in % by Wt. of Waste Feed |
|---|---|---|---|
| 100 | None | — | 44.4 |
| 99 | $Na_2CO_3$ | 1 | 44.9 |
| 90 | $Na_2CO_3$ | 10 | 39.7 |
| 95 | $CaCO_3$ | 5 | 41.7 |
| 95 | $K_2CO_3$ | 5 | 43.3 |
| 95 | $MgCO_3$ | 5 | 45.4 |
| 90 | $ZnCO_3$ | 10 | 46.5 |

As can be ssen in Table 2, up to 650° C., the corrected char yields indicate that the sodium, calcium and potassium carbonates additions above 1 percent by weight of the feed result in an increased conversion of the shredder waste feed into gaseous and liquid products.

In view of this disclosure, many modifications of this invention will be apparent to those skilled in the art. It is intended that all such modiciations which fall within the true scope of this invention be included within the terms of the appended claims.

We claim:

1. A process for pyrolytic conversion of waste selected from the group consisting of plastic and rubber to olefinic hydrocarbons, said process being characterized by comprising:

introducing into a pyrolysis zone particles of said waste and at least about 1 weight percent basic salt catalyst based on the weight of said waste;

heating said waste/salt mixture in said pyrolysis zone to a temperature of between about 400° C. and about 700° C. while flowing inert gas therethrough;

maintaining said temperature of said pyrolysis zone and said flowing gas for a time sufficient to pyrolyze said waste to char and volatile hydrocarbon-containing products;

cooling said volatile products so as to separate said products into a gas fraction and oil fractions; and recovering said fractions.

2. A process for pyrolytic conversion of wastes to hydrocarbons according to claim 1, wherein said basic salt catalyst is selected from the group consisting of oxides, hydroxides and carbonates of alkali metals or alkaline earth metals.

3. A process for pyrolytic conversion of wastes to hydrocarbons according to claim 2, wherein said catalyst is selected from the group consisting of potassium carbonate, magnesium carbonate, calcium carbonate and sodium carbonate.

4. A process for pyrolytic conversion of wastes to hydrocarbons according to claim 1, wherein said basic salt catalyst has a particle size below about 0.25 mm.

5. A process for pyrolytic conversion of wastes to hydrocarbons according to claim 1, wherein basic salt catalysts soluble in water are employed as aqueous solutions thereof, said solution being admixed with said waste prior to introduction of said waste into said pyrolysis zone.

6. A process for pyrolytic conversion of wastes to hydrocarbons according to claims 3, 4, or 5, wherein said catalyst is sodium carbonate.

7. A process for pyrolytic conversion of wastes to hydrocarbon according to claim 1, wherein said catalyst is included in an amount of between about 3 and about 15 weight percent based on the weight of said waste.

8. A process for pyrolytic conversion of wastes to hydrocarbons according to claim 1, wherein said temperature of said pyrolysis zone is between about 450° and about 650° C.

9. A process for pyrolytic conversion of wastes to hydrocarbons according to claim 1, wherein said inert gas consists of a mixture of nitrogen and carbon dioxide obtained by burning a fuel gas mixture with a stoichiometric amount of air.

10. A process for pyrolytic conversion of wastes to hydrocarbons according to claim 1, wherein at least a portion of said catalyst is admixed with said waste prior to pyrolysis of said waste.

11. A process for pyrolytic conversion of wastes to hydrocarbons according to claims 1 or 10, wherein at least a portion of said catalyst is admixed with said waste during pyrolysis of said waste.

* * * * *